United States Patent [19]

Vukovich et al.

[11] Patent Number: 5,040,653
[45] Date of Patent: Aug. 20, 1991

[54] ENGAGEMENT AND DISENGAGEMENT CONTROL FOR A FRICTION DEVICE

[75] Inventors: William J. Vukovich, Ypsilanti; Melissa M. Koenig, Dexter, both of Mich.

[73] Assignee: General Motors Corporation, Detroit, Mich.

[21] Appl. No.: 575,775

[22] Filed: Aug. 31, 1990

[51] Int. Cl.5 .............................................. F16D 25/14
[52] U.S. Cl. .................................... 192/85 R; 60/413; 192/109 F
[58] Field of Search .......................... 192/109 F, 85 R; 91/443; 60/413

[56] References Cited

U.S. PATENT DOCUMENTS

| 3,004,447 | 10/1961 | Sand | 192/109 F X |
| 3,541,791 | 11/1970 | Lvovsky et al. | 60/413 |
| 3,896,705 | 7/1975 | Patton | 192/109 F X |
| 4,560,044 | 12/1985 | Nagata | 192/109 F X |
| 4,867,294 | 9/1989 | de Tuesta | 192/109 F |
| 4,889,016 | 12/1989 | Kuwayama et al. | 74/868 |
| 4,924,731 | 5/1990 | Hayakawa et al. | 74/869 |
| 4,932,282 | 6/1990 | Arisumi | 74/867 |

FOREIGN PATENT DOCUMENTS

| 933186 | 9/1955 | Fed. Rep. of Germany | 192/109 F |
| 0754121 | 8/1980 | U.S.S.R. | 60/413 |

Primary Examiner—Rodney H. Bonck
Attorney, Agent, or Firm—Donald F. Scherer

[57] ABSTRACT

A friction device, such as a clutch or brake, has a fluid-operated piston that is pressurized to cause engagement of the friction device. An accumulator and flow restriction are disposed to assist in controlling engagement time of the friction device. The accumulator and flow restriction are disconnected from each other and from the friction device during disengagement. A shift valve is positioned to provide the desired fluid connections during engagement and disengagement.

2 Claims, 1 Drawing Sheet

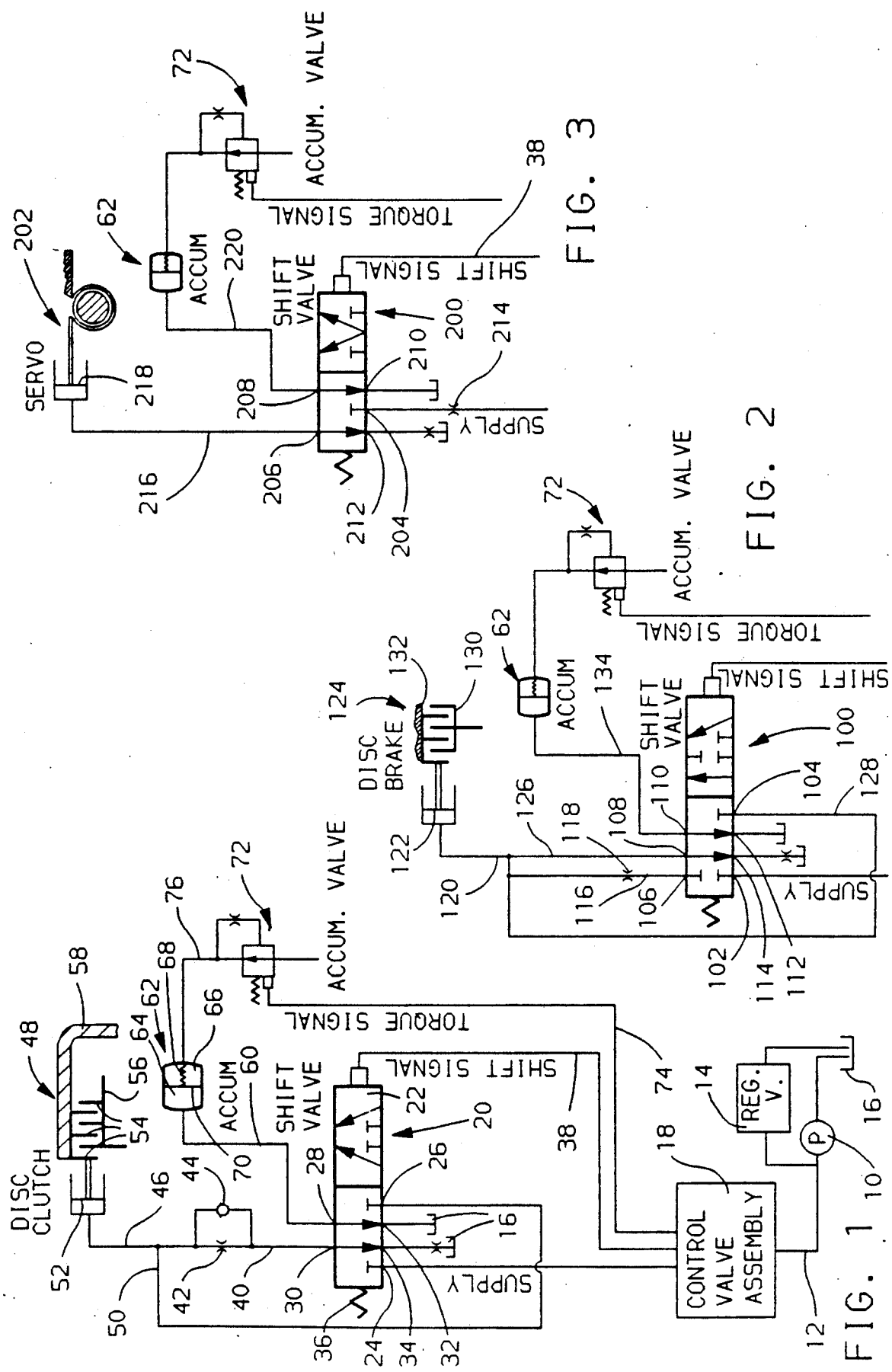

ENGAGEMENT AND DISENGAGEMENT CONTROL FOR A FRICTION DEVICE

BACKGROUND OF THE INVENTION

This invention relates to engagement and disengagement timing controls for a fluid-operated piston of a friction torque transmitting device, and more particularly, to such controls which rapidly exhaust the fluid-operated piston and specifically to downshift controls that separate the piston exhaust fluid from the timing device exhaust fluid during disengagement.

Prior art controls seeking to fluidly separate the accumulator from the friction device, use a valve member, separate from the shift valve, to control fluid flow to and from the friction device and the accumulator. With these controls, the accumulator is exhausted through the feed restriction and/or a ball check to the exhaust passage of the friction device. While these controls may provide for slightly more rapid friction device exhaust, they do not permit rapid accumulator exhaust.

SUMMARY OF THE INVENTION

The present invention incorporates the flow control function for a friction device and accumulator into the shift valve, thereby eliminating a separate control valve and the accompanying cost of manufacture and complexity of assembly. The flow control function selectively interconnects the accumulator, flow restrictions and friction device to provide for timed engagement of the friction device while permitting rapid exhaust of the accumulator and timed exhaust of the friction device during disengagement.

By reducing the disengagement time of the off-going friction device, the total heat generated during a downshift can be significantly reduced. A computer simulation of the energy transfer during a downshift of a commercially available transmission indicates that a reduction in the energy density of 220 ftlb/sqin can be attained. This is a substantial reduction in the heat generating potential and an improvement in the overall operating efficiency. This arrangement also has the advantage of having the accumulator fully exhausted in preparation for an immediate upshift if such is required by the operator. These same benefits can be attained during an upshift since the accumulator of the off-going friction device is exhausted separately.

It is an object of this invention to provide an improved fluid flow control mechanism for a fluid-operated friction device wherein during engagement, the friction device and an accumulator are in fluid communication so that the accumulator effects the engagement time and also wherein, the friction device and the accumulator are exhausted via separate paths during disengagement.

It is another object of this invention to provide an improved control as defined in the preceding object, wherein the friction device and the accumulator are in fluid communication with a common flow restriction during engagement and wherein, the accumulator is connected for free flow exhaust during disengagement.

It is a further object of this invention to provide an improved control as defined in either of the preceding objects, wherein the friction device is supplied through one flow restriction during engagement and is exhausted through another flow restriction during disengagement.

It is another object of this invention to provide an improved engagement control mechanism for a fluid-operated friction device, wherein an accumulator is disposed in fluid flow arrangement with a shift valve, a flow restriction and a fluid-operated piston, and further wherein, the shift valve is selectively controlled to provide serial fluid flow between the restriction and the accumulator and between the restriction and the piston during engagement to control the timing thereof and to provide a flow path from the accumulator to exhaust in bypassing relation with the restriction and the friction device during disengagement.

These and other objects and advantages will be more apparent from the following description and drawings.

DESCRIPTION OF THE DRAWINGS

FIG. 1 is a schematic representation of a portion of a control system incorporating one exemplary embodiment of the invention.

FIG. 2 is a schematic representation of a portion of a control system incorporating another exemplary embodiment of the invention.

FIG. 3 is a schematic representation of a portion of a control system incorporating another exemplary embodiment of the invention.

DESCRIPTION OF THE EXEMPLARY EMBODIMENTS

Referring to the drawings, wherein like characters represent the same or corresponding parts throughout the several views, there is seen in FIG. 1 a schematic representation of a portion of the control system having a conventional positive displacement pump 10, which is driven by an engine, not shown, to deliver pressurized fluid to a passage 12. The pressure level in the passage 12 is controlled by a conventional regulator valve 14 which bypasses excess fluid flow to a sump or reservoir 16.

The fluid in passage 12 is delivered to a control assembly 18 which is comprised of a plurality of conventional control elements and valve members. The control assembly is effective to control the gear ratios in a conventional automatic transmission, not shown. One of the valve members included in the control assembly 18, is a shift valve 20 which includes a movable valve member 22 which is operable to control fluid flow between a plurality of ports or passages which are connected with the shift valve 20. The ports include a supply port or passage 24, an accumulator feed port or passage 26, an accumulator return port or passage 28 and a clutch port or passage 30.

Valve 20 is also connected with two exhaust ports or passages 32 and 34 which are, in turn, connected to the reservoir 16. The movable valve member 22 is urged by a spring 36 to the spring set position shown. A shift signal passage 38 is operable to supply fluid pressure to the movable member 22 against the spring 36 to a pressure set position. The shift signal is generated in a conventional manner by the control assembly 18 and generally will be determined by the engine torque level and vehicle speed.

In the spring set position shown, the supply port 24 and accumulator feed port 26 are both closed by the valve 20, while the accumulator return port 28 is open for free flow with exhaust port 32, and the clutch port 30 is open for restricted flow through exhaust port 34 with the reservoir 16.

In the pressure set position, that is, when passage 38 is pressurized, the supply port 24 is connected with the clutch port 30 and the accumulator feed port 26 is connected with the accumulator return port 28. The clutch port 30 is connected to a passage 40 through a restriction 42, and a parallel ball check 44 to a passage 46, which in turn, is connected with a selectively engageable clutch assembly 48. The ball check 44 is open when fluid is flowing toward the port 30 to permit bypassing of the restriction 42 during disengagement of the clutch assembly 48. The passage 46 also communicates with an accumulator passage 50, which in turn, is connected to the accumulator feed port 26.

The clutch 48 is a conventional fluid-operated friction clutch incorporating a fluid-operated piston 52, an input hub 56, an output hub 58, and a plurality of interleaved friction discs 54 which are alternately splined between the hubs 56 and 58. The input hub 56 is connected with a transmission input shaft, and the hub 58 is connected with a planetary gear member or vice versa. When fluid pressure is applied via passage 46 to act on the piston 52, the friction discs 54 are urged into frictional engagement to provide a torque transmitting connection between the hubs 56 and 58.

The port 28 is connected through an accumulator passage 60 to a conventional hydraulic accumulator 62. As is well known, such accumulators have an accumulator chamber 64 and a control chamber 66. A spring member 68 urges a floating piston 70 in a direction to decrease the size of the accumulator chamber 64.

When the shift valve 20 is actuated by pressure in the passage 38, fluid passing through the restriction 42 is directed to both the piston 52 and via passages 50 and 60 to the accumulator chamber 64. As is well known, the pressure rise in the fluid acting on the piston 52 is dependent upon the restriction 42 and the accumulator 62. The restriction 42 provides a flow control and the accumulator 62 provides a variable volume which controls pressure rise.

In order to provide a wide range of control for the pressure change characteristics at the piston 52, an accumulator valve 72 is provided. The valve 72 receives a torque signal via a passage 74 from the control assembly 18. The accumulator valve 72 modulates the signal in passage 74 and delivers the modulated signal through a passage 76 to the chamber 66. As the pressure in chamber 66 increases, the pressure level at which the piston 70 begins to stroke will also increase, thereby affecting the initial pressure level that is directed to the piston 52. The fluid passing through the restriction 42 is all directed to the piston 52, until the piston 70 begins to stroke.

While it is advantageous to provide timed clutch engagement which is dependent upon the torque being transmitted, it is equally desirable to permit rapid disengagement of the clutch independent of the torque being transmitted. To accomplish this, the shift valve, upon removal of the signal in passage 38, will be urged to the spring set position. In this position, the accumulator chamber 64 is freely exhausted to the reservoir 16, while the fluid in clutch 48 is exhausted through the ball check 44 and passage 40 to the reservoir 16. In most arrangements, it is desirable to provide a slight restriction in the exhaust passage of the clutch piston to ensure against engine flare.

In the prior art control devices, the accumulator fluid and the clutch fluid are exhausted in unison through a single flow path, such that a longer clutch disengagement time is present. Also in the event that an immediate upshift is demanded by the valve 20, the accumulator chamber 64, in a conventional system, may have some residual pressure which would affect the clutch engagement time. Such an event is not likely to take place with the present invention due to the free fluid flow path between the accumulator and the reservoir which is provided by the shift valve 20.

The embodiment shown in FIG. 2 includes a shift valve 100, which has associated therewith a supply port 102, an accumulator feed port 104, a clutch apply port 106, a clutch return port 108, an accumulator port 110 and a pair of exhaust ports 112 and 114. In the spring set position shown, the ports 102, 104 and 106 are blocked, while port 110 is connected to the reservoir at port 112, and the port 108 is connected through a restricted passage to the reservoir.

The port 106 is connected via a passage 116 through a restriction 118 to a passage 120 which is connected to an apply piston 122 of a disc brake 124. The passage 120 is also in fluid communication with a passage 126 which is connected with the port 108 and a passage 128 which is connected with the port 104. The disc brake 124 is a conventional torque transmitting device in which a plurality of friction discs are urged into engagement by the piston 122 to establish a torque transmitting connection between a hub 130 and a housing or other stationary member 132. The shift valve 100 is also usable with a disc clutch, such as that described above for clutch 48.

The port 110 is connected via a passage 134 with a conventional accumulator 62. The accumulator 62 has associated therewith an accumulator 72 which functions in a manner identical to that described for the accumulator valve in FIG. 1. When the shift valve 100 receives a shift signal through the passage 38, shift valve 100 is effective to provide fluid communication between the supply port 102 and the port 106 and also between the port 104 and the port 110. In this pressure set position, the shift valve 100 is also effective to close the ports 108, 112 and 114. With the valve 100 in the pressure set position, fluid is directed from the supply port 102 to the port 106 and through passages 116 and restriction 118 to the fluid-operated piston 122. Fluid is also directed via passages 128 and 134 to the accumulator 62.

The restriction 118 provides a flow rate limit to the fluid entering the brake 124 and the accumulator 62, such that the restriction 118 and the fill time of the accumulator 62 are operable to provide a controlled engagement time for the brake 124. As described above for the embodiment of FIG. 1, the initiation of engagement can be varied by the accumulator valve 72 in response to various torque signals supplied by the passage 74.

When the shift signal is removed from passage 38, the valve 100 will be urged to the spring set position, such that the accumulator 62 is connected directly to the reservoir and the apply piston 122 is connected via passage 126 and a restriction to the reservoir. The exhaust fluid from piston 122 bypasses the restriction 118 such that the exhaust time is substantially different from and considerably shorter than the engagement timing. As described above with FIG. 1, the accumulator fluid is exhausted directly to the reservoir so that it does not affect the disengaging time of the piston 122.

A further embodiment is shown in FIG. 3 in which a shift valve 200 is utilized to control the engagement and disengagement of the torque transmitting device, such as a band brake 202 as depicted, or a clutch as shown in FIG. 1, or a disc brake as shown in FIG. 2. The type of fluid-operated torque transmitting device that is utilized with any of the embodiments does not impose a limit on the invention. The shift valve 200, shown in FIG. 3, has a supply port 204, a first outlet port 206, a second outlet port 208 and a pair of exhaust ports 210 and 212.

The supply port 204 is connected to the supply passage from control assembly 18 through a restriction 214. In the spring set position shown, the supply port 204 is closed while the ports 206 and 208 are connected to exhaust ports 212 and 210, respectively. The port 206 is connected via a passage 216 with a servo piston 218 which is operable when pressurized to engage the band brake 202. The port 208 is connected via passage 220 with the accumulator 62. The accumulator 62 and its associated accumulator valve 72 function as previously described for the embodiments of FIGS. 1 and 2.

The shift valve 200, upon the imposition of a shift signal in passage 38, is moved to the pressure set position, wherein the ports 210 and 212 are closed and the supply port 204 is connected with ports 206 and 208 simultaneously. Fluid pressure admitted through the port 204 is directed to both the servo piston 218 and the accumulator 62. However, as previously mentioned, all of the in-coming fluid must pass through restriction 214 which, in cooperation with the accumulator 62, provides an engagement time characteristic for the torque transmitting device 202.

When the shift signal is removed from passage 38 and the shift valve 200 has returned to the spring set position, the accumulator 62 is connected directly with the exhaust through ports 208 and 210, while the servo piston 218 is connected to a restricted exhaust via ports 206 and 212. The restriction in the exhaust port for the servo piston 218 presents a minimum flow restriction to the fluid. The use of such exhaust restriction is not mandatory and in some instances, may not be desirable. In some control systems, the size of the exhaust passage may be sufficient to provide the desired control for exhaust flow.

As with the embodiments described in FIGS. 1 and 2, the accumulator 62 is freely exhausted during disengagement of the torque transmitting device 202. Along with being exhausted, the fluid from the accumulator 62 is separated from the flow path of the fluid leaving the servo piston 218.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An engagement and disengagement control mechanism for controlling a fluid-operated friction device having a fluid chamber and a piston means disposed in the chamber for enforcing the engagement of friction disk means; said control mechanism comprising: a shift control valve means for directing fluid in path means to and from said fluid chamber; accumulator means for controlling the rate of pressure rise in said chamber means during engagement of said fluid-operated friction device; and said shift control valve means being effective to include said accumulator means in said path means during engagement of said fluid-operated friction device and to separately and simultaneously exhaust said fluid chamber and said accumulator means during disengagement whereby said fluid-operated friction device has an accumulator timing control only during engagement.

2. An engagement and disengagement control mechanism for controlling a fluid-operated friction device having a fluid chamber and a piston means disposed in the chamber for enforcing the engagement of friction torque transmitting means throughout an engagement time period and for permitting disengagement during a disengagement time period; said control mechanism comprising: shift control valve means for directing fluid in path means to and from said fluid chamber; accumulator means for controlling the rate of pressure rise in said chamber means during a portion of the time of engagement of said fluid-operated friction device; and said shift control valve means being effective to include said accumulator means in said path means during engagement of said fluid-operated friction device and to remove said accumulator means from said path means during disengagement whereby said fluid-operated friction device has an accumulator timing control only during the engagement time period and said accumulator means is freely exhausted during the disengagement time period.

* * * * *